2 Sheets—Sheet 1.

W. H. NEWTON.

DREDGING APPARATUS.

No. 6,876. Reissued Jan. 25, 1876.

WITNESSES

O. H. Adise.

A. S. Williston.

INVENTOR

William Henry Newton

By G. H. Chapin Atty.

2 Sheets—Sheet 2.

W. H. NEWTON.

DREDGING APPARATUS.

No. 6,876. Reissued Jan. 25, 1876.

WITNESSES.

O. H. Adix.

A. D. Williston.

INVENTOR.

William Henry Newton,

By G. H. Chapin

Atty.

UNITED STATES PATENT OFFICE.

WILLIAM H. NEWTON, OF CHICAGO, ILLINOIS.

IMPROVEMENT IN DREDGING APPARATUS.

Specification forming part of Letters Patent No. 168,278, dated September 28, 1875; reissue No. 6,876, dated January 25, 1876; application filed November 19, 1875.

*To all whom it may concern:*

Be it known that I, WILLIAM HENRY NEWTON, of Chicago, in the county of Cook and State of Illinois, have invented new and useful Improvement in Dredging Apparatus, of which the following is a specification:

The present invention relates to an apparatus for deepening rivers, canals, harbors, and water-channels; and its nature consists, first, in the combination of an open-ended suction-pipe with one or more open-ended ejection-pipes, attached to the suction-pipe and carried with it, and are projected to the front of the suction-pipe, where the excavating is to be done. The ejection-pipes have a direct communication with a force-pump of such capacity as to throw water through them with such force as to break down and disintegrate any ordinary earthy substance, and, by the return action of the current, hold such substance suspended in the water for the suction-pipe to take it up; and to attain this end the ejection-pipes are brought closely to the earth to be removed, that the resistance of the surrounding water may not retard the velocity of water passing through them.

In practice the ejection-pipes are to be placed as nearly as possible at right angles to the surface of the substance to be removed, or bed of a stream, that no force of water be lost, and that the substance to be disintegrated may not be washed from the suction-pipe.

The latter pipe is attached to a pump, which will exhaust the atmosphere from it that the pressure per square inch at the mouth of the pipe may be equivalent to the pressure of atmosphere; second, in an adjustable hood pivoted to the lower end of the suction-pipe, for the purpose of directing the material to be elevated into the pipe; third, in pivoted nozzles to the ejection-pipes, whereby any required direction may be given to the excavating-currents, as the whole is hereinafter described and shown.

Figure 1:
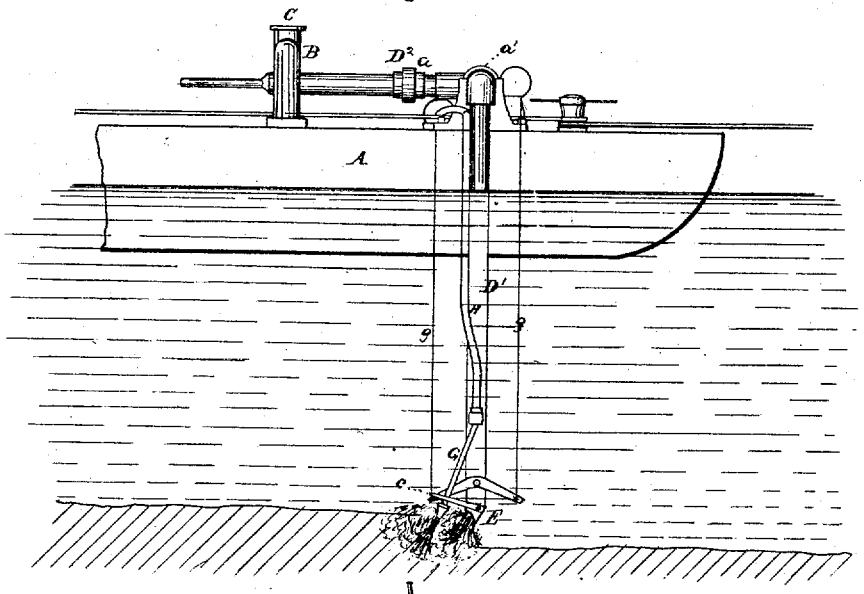
Figure 2:
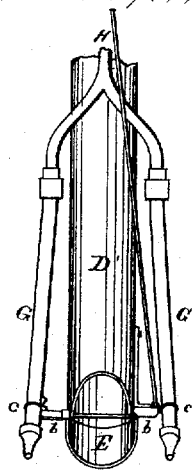
Figure 3:
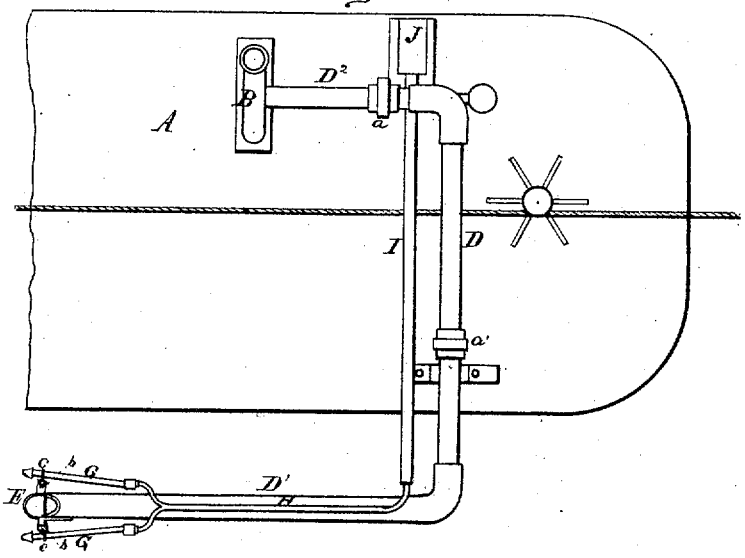
Figure 4:
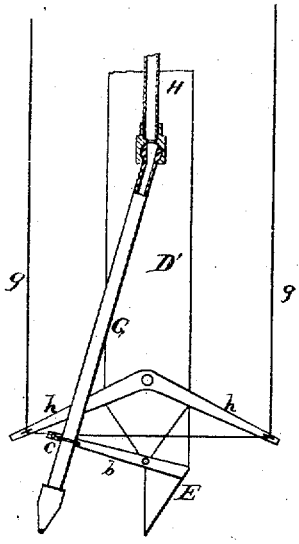

In the accompanying drawings, Figure 1, Sheet 1, is a side elevation of my apparatus as in operation; Fig. 2, an enlarged view of the lower end of the suction-pipe, hood, and ejection-pipes. Fig. 3 is a plan view of the apparatus, and a broken part of hull or scow supporting the same; Fig. 4, an enlarged side view of Fig. 2.

D′ represents a suction-pipe, which connects with an exhaust-pump, B, of suitable capacity to remove the air from the pipe, and which is open at its lower end, and is provided with a reversible hood, E, pivoted to the pipe, as at 2. This hood serves the purpose of directing the disintegrated material into the pipe; and to attain this end with the varied positions of the pipe D a bar, *h h*, is fastened to the latter, and is provided at its ends with anti-friction rollers, over which a wire cable or cord, *g g*, is put and carried to the deck of the hull or scow to a convenient place to be operated.

*b* represents an arm attached to the hood E, extended and looped to the pipe G, and at its end is attached to the cable *g*, between the anti-friction rollers.

This arrangement is such that by drawing on the cable the nozzles or pipes G may be reversed to the opposite side of the pipe D′, carrying the hood also to the opposite side for dredging or excavating in another direction.

The main force or ejection is shown at H, and is supported by the pipe E. Its lower end connects with the nozzle G by a ball-and-socket joint, and its upper end connects with a force-pump by means of a flexible pipe, I, and the suction-pipe D′ is connected by means of a sleeve-joint to a horizontal pipe, D, which communicates with a pump, B, or exhausting-engine.

In practice a conveyer-pipe is to be attached to the pump B, for carrying the excavated material to any desired place.

The operation is as follows: The boat or hull is placed over or near the place to be dredged, and held in place by cables. The pipe D′ is then lowered to the bed of the stream or channel. The pumps are then put in motion, and the stream or streams ejected through the pipes H G directly on the earth will break it down and disintegrate it, and the return current will hold the material so disintegrated suspended for the suction-pipe to take up.

I am aware that suction-pipes are old, and that ejection-pipes have been used for disintegrating earth, but that these have been used separately. I am also aware that a dredging apparatus was patented to E. Bazin, September 30, 1873, in the United States, which consists, substantially, of a horizontal perforated pipe receiving the substance to be elevated by hydrostatic power, and that there is shown and described in said patent a horizontal pipe, lying below the perforated pipe, and provided with a series of nipples or small short pipes, which eject water in a horizontal direction; but as the hydrostatic pressure produces an upward current through the perforated pipe, the water from the short pipes is directed upward, instead of directly down, as it is through the ejection-pipes in my apparatus.

I also disclaim the devices shown in James Robertson's patent, dated July 21, 1868, and numbered 80,225, for improvement in excavating-machines.

I claim and desire to secure by Letters Patent of the United States—

1. The combination of a suspended open-ended suction-pipe, D′, operated wholly by a separate vacuum-pump, with ejection-pipes G G H, supported by the suction-pipe, and made to force a direct downward current of water from a separate force-pump onto the bed of a water-course, with such direction, with reference to the suction-pipe and the bed of the water-course, that the return currents will hold the disintegrated material suspended for the suction-pipe to elevate, as set forth.

2. The pivoted adjustable hood E, combined with the swinging pipe D′, substantially as described.

3. The adjustable nozzles G G, combined with the adjustable hood E and swinging pipe D′, substantially as described.

WILLIAM HENRY NEWTON.

Witnesses:

G. L. CHAPIN,

O. H. ADIX.